(12) United States Patent
Kowalchuk et al.

(10) Patent No.: US 9,615,499 B2
(45) Date of Patent: Apr. 11, 2017

(54) HYDRAULIC WORK UNIT LEVELING AND CALIBRATION SYSTEM FOR AN AGRICULTURAL IMPLEMENT

(71) Applicant: CNH Industrial Canada Ltd., Saskatoon, Saskatchewan (CA)

(72) Inventors: Trevor Kowalchuk, Saskatoon (CA); Nick Ryder, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 14/559,227

(22) Filed: Dec. 3, 2014

(65) Prior Publication Data

US 2016/0157413 A1 Jun. 9, 2016

(51) Int. Cl.
G06F 7/70 (2006.01)
A01B 63/22 (2006.01)
A01C 7/10 (2006.01)
A01C 7/20 (2006.01)

(52) U.S. Cl.
CPC ............... *A01B 63/22* (2013.01); *A01C 7/10* (2013.01); *A01C 7/203* (2013.01)

(58) Field of Classification Search
CPC .... A01B 79/02; A01B 63/22; Y10T 137/7762
USPC .......... 701/50; 172/4.5, 9, 239; 137/14, 488
See application file for complete search history.

(56) References Cited

U.S. PATENT DOCUMENTS

| | | | |
|---|---|---|---|
| 4,332,126 A | 6/1982 | Van Auwelaer et al. | |
| 5,152,347 A | 10/1992 | Miller | |
| 5,463,854 A | 11/1995 | Chmielewski, Jr. et al. | |
| 6,041,583 A | 3/2000 | Goering et al. | |
| 6,076,611 A | 6/2000 | Rozendaal et al. | |
| 6,216,072 B1 | 4/2001 | Boe et al. | |
| 6,698,523 B2 | 3/2004 | Barber | |
| 8,162,070 B2 | 4/2012 | Smith et al. | |
| 8,235,130 B2 * | 8/2012 | Henry | A01B 63/22 172/239 |
| 9,074,347 B2 * | 7/2015 | Vigholm | E02F 9/2217 |
| 2007/0023195 A1 * | 2/2007 | Peck | A01B 73/046 172/311 |
| 2008/0257570 A1 | 10/2008 | Keplinger et al. | |
| 2011/0018219 A1 | 1/2011 | Oriet et al. | |
| 2012/0186503 A1 | 7/2012 | Sauder et al. | |
| 2012/0279187 A1 | 11/2012 | Deneault et al. | |
| 2012/0305274 A1 | 12/2012 | Bassett | |
| 2013/0087351 A1 | 4/2013 | Sulzer | |

FOREIGN PATENT DOCUMENTS

CN 101080968 5/2007

* cited by examiner

*Primary Examiner* — Gertrude Arthur Jeanglaud
(74) *Attorney, Agent, or Firm* — Rebecca L. Henkel; Rickard K. DeMille

(57) ABSTRACT

An agricultural implement has a depth control system in which a position sensor directly measures linear translation of a hydraulic cylinder that lifts and lowers a work unit on an implement frame to set and adjust the depth of the work unit without the use of a rockshaft. The position sensor may be positioned adjacent to or integrally formed with the hydraulic cylinder, and provides a voltage to a controller remote from the implement. The controller automatically adjusts the flow of hydraulic fluid to and from the hydraulic cylinder to maintain the depth of each work unit at an operator-selected level and can be used to calibrate the actual position of multiple work units relative to the frame and to one another.

16 Claims, 4 Drawing Sheets

HYDRAULIC WORK UNIT LEVELING AND CALIBRATION SYSTEM FOR AN AGRICULTURAL IMPLEMENT

FIELD OF THE DISCLOSURE

The present invention relates generally to farm and agricultural related machinery and, more particularly, to a method and system for leveling work units mounted to a frame that are raised and lowered by one or more hydraulic cylinders.

BACKGROUND OF THE DISCLOSURE

An agricultural implement is generally composed of a number of work units, such as seed or fertilizer dispensers, or soil preparation tools, e.g., discs, tillers, cultivators, plows, and the like, that are typically carried by an implement frame that is hitched to and towed by a tractor, combine or similar wheeled device. The implement frame is generally supported above the ground by a pair of frame supporting wheels, which are mounted to wheel mounting spars that are rigidly attached to a rockshaft. The rockshaft may be rotated by a hydraulic cylinder to effectively raise and lower the implement frame and thus the work units.

For many agricultural implements, it is necessary for an operator to manually raise and lower the implement frame and the hydraulic cylinder holds the implement frame at the position set by the operator. More particularly, conventional depth control systems utilize a poppet valve to stop the flow of hydraulic fluid to the hydraulic cylinder to set the depth of the implement frame and thus the work units. Such stop valves have been found to be inconsistent in setting the depth of the implement frame and the valve is set until hydraulic fluid flow is reversed.

More recently, implements have been designed whereby the depth of the implement frame is monitored and hydraulic fluid flow to the hydraulic cylinder is controlled accordingly. U.S. Pat. No. 8,235,130 to Henry et al., the entirety of which is expressly incorporated by reference herein, discloses an implement mounted depth control system whereby an electronic position sensor is mounted to the implement frame and senses the rotational position of the rockshaft. The rotational position of the rockshaft is used by a monitor to derive a depth of the work units and control the hydraulic cylinder to raise or lower the implement frame to raise or lower the work units to an operator-selected depth. The depth control system further allows an operator to raise and lower the implement frame using controls within the operator cab.

While implements of this type can be readily controlled through the operation of the controls to position the work units using the rockshaft, the use of a rockshaft in the system has a number of drawbacks. For example, the mechanically operated rockshaft is only able to mechanically adjust the position of all of the work units on the frame simultaneously, such that individual adjustment of a particular work unit cannot be achieved using only the rockshaft. Further, the rockshaft, while having a relatively simple construction, can fail, or be damaged, and are costly to utilize and replace.

As a result, it is desirable to develop a system capable of controlling and adjusting the position of individual work units on the frame of an implement.

SUMMARY OF THE DISCLOSURE

According to one exemplary embodiment of the present invention, an agricultural implement towed by a tractor or other vehicle includes a work unit positioning control system in which a position sensor directly measures linear translation of a hydraulic cylinder that lifts and lowers an individual work unit on an implement frame to set and/or adjust the position and/or depth of the work unit. The position sensor may be positioned adjacent or integrally formed with the hydraulic cylinder, and provides a signal to a controller remote from the implement. In one implementation, the controller automatically adjusts the flow of hydraulic fluid to and from the hydraulic cylinder to maintain the depth of the work unit at an operator-selected position.

Thus, in one embodiment, an operator raises or lowers the implement frame to a desired depth, along with each of the work units or frame sections on the implement frame. The operator can perform a similar movement of each of the work units by either manually controlling or operating the hydraulic cylinders connected to the individual frame sections or work units or by providing the controller with an input regarding the desired depth for the specific work units. The output of the position sensor on each hydraulic cylinder has a voltage level that establishes a baseline voltage for the desired depth or position of the particular work unit, to which subsequent voltage readings of the position sensor are compared. More particularly, as the implement is towed along the field, voltage signals are output by the position sensors in a real-time manner regarding the position of each work unit as determined by the sensors on each unit, and those readings are compared by the controller to the baseline voltage. Upon detecting any variance in the reading for one or more of the cylinder sensors, the controller then controls the flow of hydraulic fluid to and from the specific cylinder so that the cylinder raises or lowers the individual work unit on the implement frame. As the individual work unit is raised or lowered, new readings are provided by the position sensor and used by the controller to control hydraulic pressure to minimize the difference between the readings of the position sensor and the baseline voltage, thereby achieving the proper positioning of the individual work units. The present invention also allows the operator to manually adjust the depth of the individual work units remotely from within the operator cab using a manual control feature of the controller.

Therefore, in accordance with one aspect of the invention, an agricultural machine includes a frame configured to carry a plurality of farming related work units. A number of cylinders are coupled between the frame and the individual work units and are configured to raise and lower the individual work units relative to the frame to adjust the depth of the work units. A sensor is associated with each cylinder and measures the linear displacement of the cylinder in a suitable manner. The output of the sensor is a value indicative of the linear displacement and thus is indicative of the depth of the work unit to which the cylinder is attached.

In accordance with another aspect of the invention, a method of controlling the depth of an agricultural work unit is provided. The method includes providing a set-point value based on a selected initial position of the work unit and measuring a linear translation of a hydraulic cylinder coupled to the work unit. The method further includes providing a measured value based on the linear translation of the hydraulic cylinder and comparing the measured value to the set-point value. The method also includes controlling hydraulic fluid flow to and from the hydraulic cylinder based on the comparison to reduce a difference between the measured value and the set-point value. The method of controlling the hydraulic fluid flow can additionally be done in a real-time manner, with changes made to the hydraulic fluid flow based on continuous outputs from the sensors concerning the changes in linear translation of the various cylinders while the work unit is in motion or use.

According to a further aspect of the invention, a farming machine includes a frame and a plurality of work units coupled to the frame. A hydraulic cylinder is coupled to each work unit on the frame and is operative to raise and lower the work unit relative to the frame as well as the other work units. A sensor is proximate each cylinder and measures the linear displacement of the cylinder. A controller receives the output of the sensor and automatically controls pressure in the hydraulic cylinder to adjust the position of the individual work unit based on the output of the sensor.

According to still another aspect of the invention, a method of calibrating the depth of an agricultural work unit is provided. The method includes providing a set-point value based on a selected initial position of the work unit and measuring a linear translation of a hydraulic cylinder coupled to the work unit. The method further includes providing a measured value based on the linear translation of the hydraulic cylinder and comparing the measured value to the set-point value. The method further includes adjusting the linear translation of the cylinder if the depth of the work unit is not equal to the desired depth for the work unit at the set-point value. The method further includes storing the adjusted linear translation of the hydraulic cylinder corresponding to the set-point value.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The drawings illustrate the best mode of practicing the present disclosure and preferred exemplary embodiments of the invention are illustrated in the accompanying drawings in which like reference numerals represent like parts throughout.

In the drawings.

DETAILED DESCRIPTION OF THE DISCLOSURE

The present invention is directed to an agricultural implement having a frame that carries a number of firming related tools, such as discs, tillers, sweeps, or dispensers, whose depth is controlled by a depth control system. As will be described, the depth control system includes a sensor, such as a linear potentiometer, that outputs a signal having characteristics that are a function of the linear displacement of hydraulic cylinders that raise and lower the implement frame and the individual work units. As known in the art, the hydraulic cylinder includes an extendable piston or ram that when extended lifts the implement frame or work unit to which it is attached and when retracted lowers the implement frame or work unit. In one embodiment, the sensor includes a potentiometer that is integrally formed with the cylinder. Representative cylinders are described in U.S. Pat. Nos. 7,307,418, 7,259,553, and 7,034,527, the disclosures of which are incorporated herein by reference.

Figure 1:
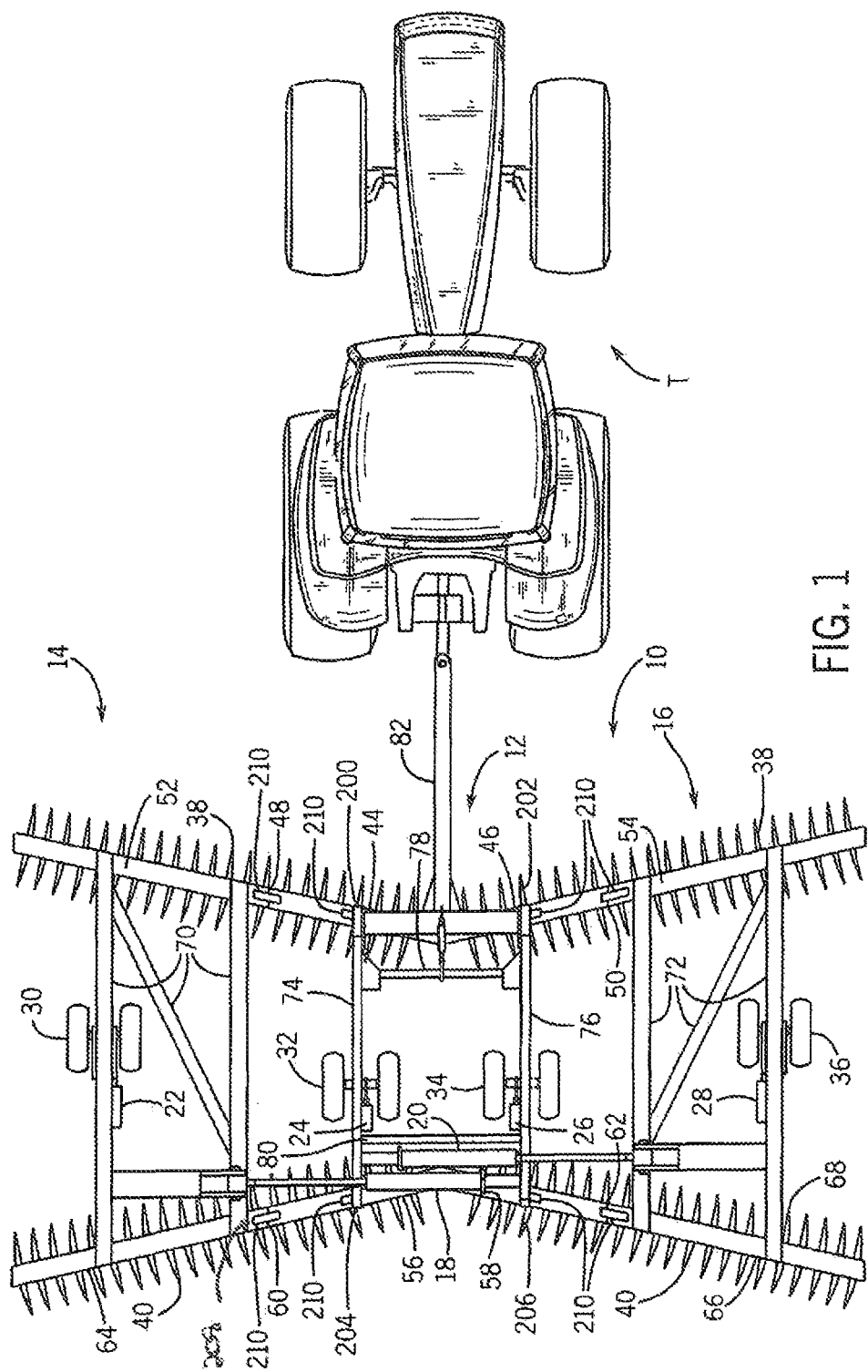
FIG. 1 is a top view of an agricultural machine and an agricultural implement hitched to the agricultural machine and having a depth control system according to one embodiment of the invention.

In FIG. 1, an implement 10 is illustrated having a central frame 12, two wings 14 and 16 pivotally coupled to the central frame, lift actuators 18 and 20 for lifting the wings 14, 16 above the frame 12, wheel actuators 22, 24, 26, and 28 pivotally connected between the frame 12 and wings 14, 16 and wheel sets 30, 32, 34, and 36 for raising and lowering wheel sets 30, 32, 34, and 36, front tool gang 38 fixed to the front of the frame and wings, rear tool gang 40 fixed to the rear of the frame 12 and wings 14, 16, each of which comprise movable components or work units of the implement 10.

Front tool gang 38 includes inner forward gang tubes 44 and 46 which are connected to central frame 12 via pivotal couplings 200, 202 and extend laterally away from the central frame 12. These gang tubes 44, 46 also have pivotal couplings 48 and 50 disposed at their outer ends to which outer forward gang tubes 52, 54, respectively, are pivotally connected.

Rear tool gang 40 includes inner rear gang tubes 56 and 58 which are connected to central frame 12 via pivotal couplings 204, 206 and extend laterally away from the central frame 12. These gang tubes 56, 58 also have pivotal couplings 60 and 62 disposed at their outer ends to which outer rearward gang tubes 64 and 66, respectively, are pivotally connected.

A plurality of ground engaging tools such as planters, seeders, fertilizers, soil preparation devices, among others, and here shown as discs 68, are fixed to and disposed below each of the gang tubes 44, 46, 52-58, 64 and 66. Like each pair of inner and outer gang tubes themselves, these discs 68 are arranged in a substantially straight line.

The gang tubes 44, 46, 56, 58 on each side of the implement 10 are each bolted to a wing frame 70, 72 on that side of the implement 10 to provide structural support for the respective sides of the implement 10. In particular, outer gang tubes 52 and 64 are coupled to wing frame 70, and outer gang tubes 54 and 66 are coupled to wing frame 72.

The outer gang tubes 52, 54, 64, 66 are pivotally coupled to the inner gang tubes 44, 46, 56, 58 to permit them to be lifted above and over the central frame 12 to permit the implement to be folded up for clearance when towed over the road. This lifting is provided by lift actuators 18 and 20, here shown as hydraulic cylinders. Lift actuator 18 is coupled between central frame 12 and wing frame 70 to lift wing 14, and lift actuator 20 is coupled between central frame 14 and wing frame 72 to lift wing 16. When lift actuators 18 and 20 are retracted, they pull their associated wings 14 and 16 upward and over the top of central frame 12 about pivotal couplings 48, 60, and 50, 62, respectively.

Wing 14 includes wing frame 70, front and rear gang tubes 52 and 64, respectively, and the ground engaging tools attached to those tubes. Wing 16 includes wing frame 72, front and rear gang tubes 54 and 66, and the ground engaging tools attached to those tubes.

The central frame 12 includes two fore-and-aft extending members 74 and 76 to which wheel sets 32 and 34, respectively, are pivotally mounted. Side-to-side members 78 and 80 are disposed at the front and rear, respectively, of the frame and are coupled to members 74 and 76 to form a substantially rectangular framework. A tongue 82 is coupled to central frame 12 and allows the implement to be hitched to a tractor T in a known manner.

At each of the pivotal couplings connected to the various gang tube sections 44, 46, 52-58, 64 and 66 and the wheel sets 30-36 is disposed an actuator 24, 26, 208. In one embodiment, the actuators 24, 26, 208 are hydraulic cylinders 210, with each of the cylinders including an integrated linear position sensor, such as those described in U.S. Pat. Nos. 7,307,418, 7,259,553, and 7,034,527, the disclosures of which are incorporated herein by reference. Each cylinder 210 controls a work unit of the implement 10 and is connected between the adjacent pivoting gang tube sections 44, 46, 52-58, 64 and 66 and/or the wheel sets 30-36 and the frame 12 in a known manner such that the cylinders 210 can control the movement, and thus the height of the respective sections or work units defined by the pivotal couplings relative to one another.

Figure 2:
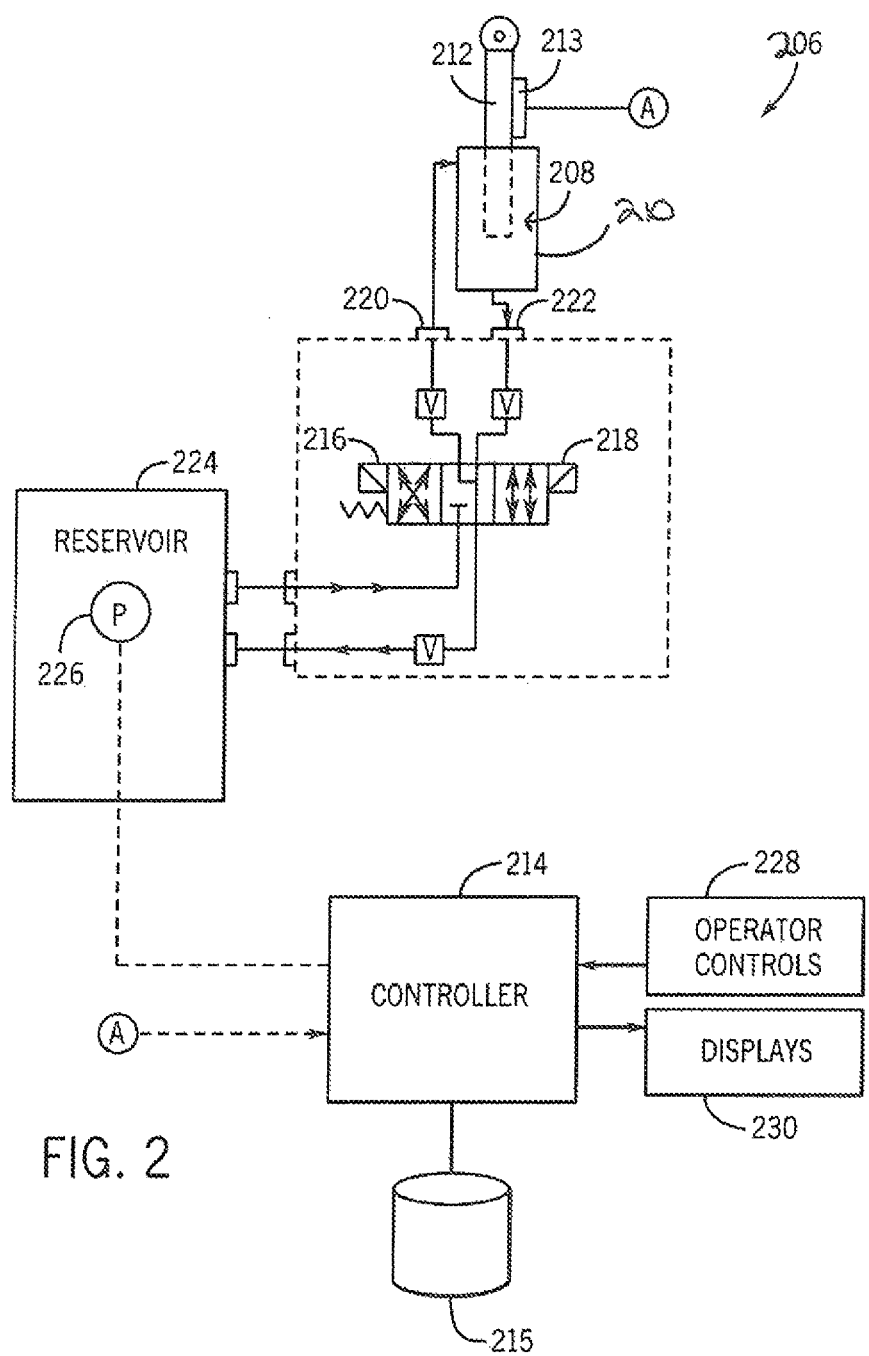
FIG. 2 is a schematic diagram of a depth control system according to the present invention.

A depth control system 206 located on the implement 10 is schematically illustrated in FIG. 2 and shows the controls for the flow of hydraulic fluid to and from each of the hydraulic cylinders 210. Piston 212 is extendable and retractable from cylinder 210 and has an integrated linear potentiometer 213 that provides a signal to a controller 214 of the tractor T. As will be described, the controller 214 selectively energizes a first solenoid 216 and a second solenoid 218 operably connected to the cylinder 210. Hydraulic fluid is supplied to the cylinder 210 through supply port 220 and is returned through a return port 222. The solenoids 216 and 218 are fluidly connected to a fluid reservoir 224 that includes a pump 226.

When first solenoid 216 is energized, hydraulic fluid is supplied to the cylinder 210 along a fluid path between reservoir 224 and cylinder 210, which is connected on one side of each pivotal coupling, causing a consequent extension of piston 212 that is coupled to the other side of each pivotal coupling. Conversely, when second solenoid 218 is energized, a fluid path is opened between the cylinder 210 and the reservoir 224 resulting in fluid being drawing from the cylinder 210. This causes a retraction of the piston 212 back into the cylinder 210. Depending on the position of the cylinder 210 and the piston 212, either solenoid 216, 218 can effect a lifting or lowering of one side of the pivotal coupling relative to the other. For example, in one exemplary embodiment, to raise outer gang tube 52 relative to gang tube 44 about the pivotal coupling 48, if piston 212 is connected to the outer gang tube 52, activation of solenoid 218 will retract the piston 212, causing the lifting of outer gang tube 52 about the pivotal coupling 48, while activation of solenoid 216 will extend the piston 212 and lower the outer gang tube 52. Conversely, in an exemplary embodiment of the connection of the cylinder 210 and piston 212 between frame 12 and wheel set 36, retraction of piston 212 using solenoid 218 causes the lowering of the frame 12 relative to the wheel se 36, while extension of piston 212 using solenoid 216 raises the frame 12.

The controller 214 selectively energizes the solenoids 216, 218 to maintain the depth of the various movable components of the implement 10 at an operator selected level, which is selected using appropriate operator controls 228 within the operator cab of the tractor. The operator cab may also include various displays 230 to provide feedback regarding operation of the depth control system and other systems of the implement or tractor.

Figure 3:
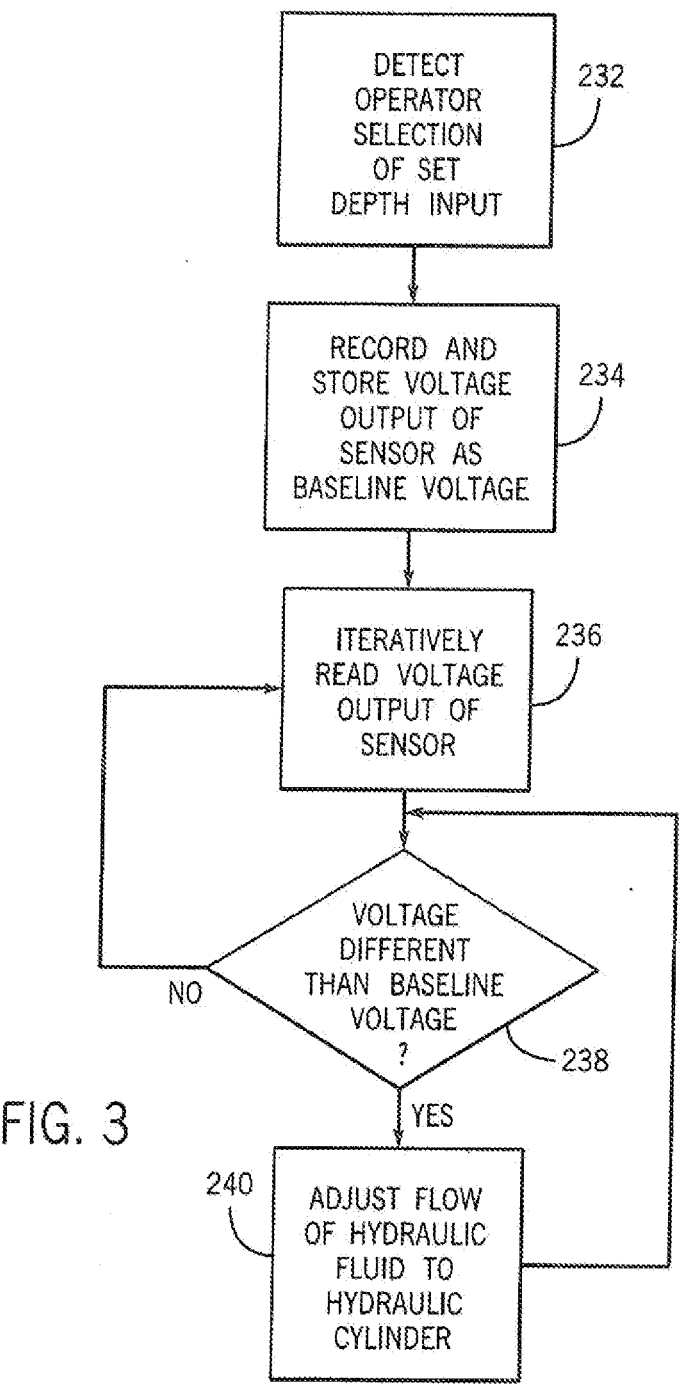
FIG. 3 is a flow chart setting forth the steps of a method of setting the depth of the agricultural implement of FIG. 1.

The feedback provided by the integrated potentiometer 213 is used by the controller 214 to derive a relative depth of the various work units of the implement 10. More particularly, and referring now to FIG. 3, the operator manually sets the overall implement 10 to a desired depth using the controls 228. The depth can be set remotely using controls 228 within the operator cab of the tractor if so equipped or at the implement itself. Once the depth has been selected, the operator activates a set-depth control which is detected by the controller 214 at block 232. Responsive thereto, the controller 214 reads and stores the output of the potentiometer 213 integrally formed with each cylinder 210 associated with a particular work unit. The output of the potentiometers 213 provides baseline voltages that is stored in memory or database 215 at block 234. As the implement 10 is towed along the field, the controller 214 iteratively reads the output of each of the potentiometers 213. Any leakage of hydraulic fluid as the implement 10 is being towed, which can cause a change in the depth of the implement components or work units, is detected by a change in the voltage output of one or more of potentiometers 213. That is, as any piston 212 is retracted or extended as a result of unintended changes in the flow of hydraulic fluid to and from the associated cylinder 210, the output of the potentiometer 213 for that cylinder 210 will also change. Those changes are detected by the controller at block 236 and compared to the baseline voltage at block 238 for that cylinder 210, lithe position of the piston 212 has changed, which would result in a change in the depth of the implement component or work unit, the voltage output of the potentiometer 213 will differ from the stored baseline voltage. Thus, if the output voltage is different than the stored baseline voltage, the controller 214 selectively energizes one of the solenoids 216, 218 at block 240 to either extend or retract the piston 212 from the particular cylinder 210 and change the depth of the corresponding work unit until the output voltage of the associated potentiometer 213 equals, within some tolerance, the baseline voltage. If the voltage substantially equals the baseline voltage for the baseline position of the associated work unit, the controller 214 returns to block 236 with continued monitoring of the potentiometer 213. In this manner, the controller 214 can identify any cylinders 210 that are out of alignment and effect a correction on the fly during operation of the implement 10.

In addition, using the controls 228, the operator can effect an on the go change to the depth of the various components or work units of the implement 10, such as when adjusting the depth of the implement components or work units on a headland turn. By operating controls 228, the operator can signal the controller 214 to activate the solenoids 216, 218 for the selected cylinders 210 to raise the associated work units during the turn, and subsequently lower the selected work units upon completion of the turn. Further, in a method similar to that of FIG. 3, instead of comparing the output signal from the sensor 213 to a baseline voltage, as in block 238, the controller 214 can compare the output signal from the sensor 213 to the output signal from another sensor 213 associated with another work unit. In this manner, the controller 214 can operate the cylinders 210 relative to one another, using the output signal from one of the sensors 213 as the set point or baseline, instead of a set point or baseline voltage stored in the database 215 operably connected to the controller 214.

Figure 4:
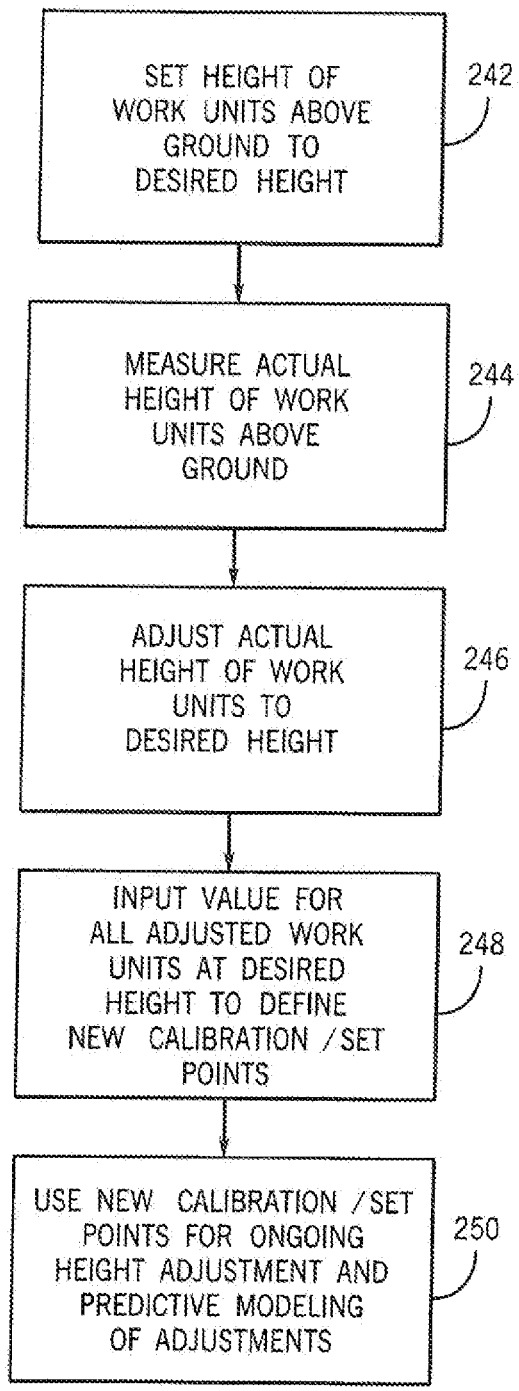
FIG. 4 is a flow chart setting forth the steps of a method of calibrating the pre-set depth settings of the agricultural implement of FIG. 1.

Referring now to FIG. 4, the potentiometers 213 and controller 214 can be utilized to calibrate the depth settings stored in database 215 operably connected to the controller 214 for each of the work units 30-36, 44, 46, 52-58, 64, 66. During the initial set up of the implement) 10, at block 242 the operator can move the individual work units 30-36, 44, 46, 52-58, 64, 66 to a desired height above the ground using the controls 228. In block 244, the operator then measures the distance of the work units 30-36, 44, 46, 52-58, 64, 66, and particularly the discs 68 to the ground. After adjusting in block 246 the position of any individual work units to have each unit properly positioned, e.g., the associated discs 68 disposed the desired or specified distance above the ground, in block 248 the operator inputs these values into the controller 214 using the controls 228. Alternatively, the operator can select a calibration function on the controls 228 to indicate to the controller 214 that the outputs from the various cylinders 210 are to be stored in database 215 and used by the controller 214 for the depth control of the work units, effectively providing a new zero point or baseline position for the work units to accommodate for manufacturing tolerances or variances in individual work units, or other system inaccuracies. In further use in block 250, the controller 214 uses these calibration set points to establish the desired working depth for the individual work units. With the position inputs for the individual work units 30-36, 44, 46, 52-58, 64, 66 in the calibration process, the controller 214 and any associated software can build a predictive curve of the position of the piston 212 for a cylinder 210 versus the predicted depth of the discs 68 with more calibration cycles providing a more accurate prediction. This is beneficial as in parallel lift implements the various portions or work units of the implements are not completely linear due to the geometry of a parallel lift system, such as implement 10.

Alternatively, in a method similar to that of FIG. 4, instead of measuring all of the work units as in block 244, the operator or controller 214 can measure a single work unit or any number of units less that all of the work units to determine the actual height of the particular unit(s). That unit(s) can then be adjusted similarly to block 246, with the resulting set point or baseline generated after adjustment and inputted in block 248 being utilized as a the set point for the remainder of the work units.

In a preferred embodiment, the position sensor is integrally formed with the hydraulic cylinder 210 and its piston 212, but it is understood that other types of sensors could be used to directly measure the position of the piston 212 and cylinder 210 relative to one another. Moreover, sensors that measure voltage changes as a function of the displacement of a cylinder is representative and as such sensors that measure other types of parameters, such as sound, current, force, and the like, may be used and are considered within the scope of the invention.

Additionally, it is recognized that the output of the sensor could be provided to the controller in a wired or wireless transmission.

Further, as the particular illustrated construction of the implement is one exemplary embodiment, it is understood that the implement 10 can have various other alternative constructions, such as with multiple work units independently pivotally connected to the frame 12 in a manner similar to the wheel sets 30-36.

Many changes and will modifications could be made to the invention without departing from the spirit thereof. The scope of these changes will become apparent from the appended claims.

We claim:

1. An agricultural machine transportable in a agricultural field, comprising:
    a frame;
    a plurality of farming related work units pivotally coupled to the frame;
    a number of cylinders coupled between the frame and each of the work units, each cylinder configured to raise and lower a corresponding work unit relative to the frame and to other work units to adjust a depth of the corresponding work unit;
    a fluid reservoir operably connected to each of the number of cylinders;
    a number of fluid flow valves operably connected between the fluid reservoir and each of the cylinders to control the flow of fluid between the reservoir and the cylinders;
    a position sensor associated with each cylinder and configured to measure a linear displacement of each cylinder and output a signal indicative of a depth of the work unit associated with the cylinder; and
    a controller operably connected to the position sensors and the fluid flow valves associated with each cylinder, the controller operable to selectively direct the flow of fluid between the reservoir and each valve automatically in response to the signal from the position sensor for the associated cylinder to selectively raise and lower each work unit relative to the frame independently of the other work units during transport of the agricultural implement through the agricultural field.

2. The agricultural machine of claim 1 wherein the position sensor is a linear potentiometer instrument.

3. The agricultural machine of claim 2 wherein the linear potentiometer instrument is configured to output a signal having a voltage that changes with linear displacement of the cylinder.

4. The machine of claim 1 wherein the work units are seed or fertilizer dispensers.

5. The machine of claim 1 wherein the work units are soil preparation devices.

6. The machine of claim 1 wherein the work units are wheel sets.

7. The machine of claim 1 wherein the controller is further configured to control the flow of fluid to the cylinder to minimize a difference between an instantaneous value of a parameter measured by the sensor and a set point value for the parameter.

8. The machine of claim 1 further comprising operator controls operably connected to the controller to allow an operator to vary the depth of the work units.

9. The machine of claim 1 further comprising a database operably connected to the controller and configured to store baseline signals for comparison with the output signals from the position sensors.

10. The machine of claim 9 wherein the baseline signals stored in the database are rewritable.

11. A method of controlling the depths of first and second agricultural work units of a plurality of agricultural work units operably connected to a frame, the frame being transportable through an agricultural field, comprising:
    providing a stored first set-point value for a baseline position of the first work unit;
    measuring a linear translation of a first hydraulic cylinder coupled between the first work unit and the frame and configured to raise and lower the first work unit;
    providing a first measured value based on the linear translation of the first hydraulic cylinder;

comparing the first measured value to the first set-point value;
controlling hydraulic fluid flow to and from the first hydraulic cylinder based on the comparison to reduce a difference between the first measured value and the first set-point value so as to automatically adjust the depth of the first agricultural work unit independently of the other of the plurality of agricultural work units during transport of the frame through the agricultural field;
providing a stored second set-point value for a baseline position of the second work unit;
measuring a linear translation of a second hydraulic cylinder coupled between the second work unit and the frame and configured to raise and lower the second work unit;
providing a second measured value based on the linear translation of the second hydraulic cylinder;
comparing the second measured value to the second set-point value; and
controlling hydraulic fluid flow to and from the second hydraulic cylinder based on the comparison to reduce a difference between the second measured value and the second set-point value so as automatically to adjust the depth of the second agricultural work unit independently of the other of the plurality of agricultural work units during transport the frame through the agricultural field.

12. The method of claim 11 wherein the step of providing the stored first set-point value comprises calibrating the stored first set-point value.

13. The method of claim 11 wherein the step of calibrating the stored first set-point value comprises:
selecting a position for the first work unit associated with a stored value using a controller operably connected to the first hydraulic cylinder associated with the first work unit;
comparing the selected position to an actual position of the first work unit; and
adjusting the stored value for the selected position of the first work unit to correspond to a measured value for the actual position of the first work unit.

14. The method of claim 13 wherein the stored value is the first set-point value.

15. The method of claim 13 further comprising the step of adjusting a stored value for the second work unit after adjusting the stored value of the selected position for the first work unit.

16. The method of claim 15 wherein the step of adjusting the stored value for the second work unit comprises adjusting the stored value for the selected position of the second work unit to correspond to a measured value for the actual position of the first work unit.

* * * * *